United States Patent [19]

Muenzer

[11] Patent Number: 4,863,306
[45] Date of Patent: Sep. 5, 1989

[54] POLE EXTENDING ADAPTER

[76] Inventor: John A. Muenzer, 3934 Surrey, Toledo, Ohio 43615

[21] Appl. No.: 132,772

[22] Filed: Dec. 14, 1987

[51] Int. Cl.$^4$ .............................................. B25G 3/00
[52] U.S. Cl. ..................................... 403/299; 285/177
[58] Field of Search ................. 285/177, 331; 403/299

[56] References Cited

U.S. PATENT DOCUMENTS

| 2,351,275 | 6/1944 | McConnel | 285/177 X |
| 3,680,896 | 8/1972 | Cupit | 285/177 |
| 4,274,665 | 6/1981 | Marsh | 285/177 |
| 4,318,547 | 3/1982 | Ericson | 285/177 X |

FOREIGN PATENT DOCUMENTS 704684  2/1954  United Kingdom ................ 285/177

Primary Examiner—Dave W. Arola
Attorney, Agent, or Firm—George R. Royer

[57] ABSTRACT

The subject invention is an adapter aiding in the extension of long, traditionally extending pole members, such as flag poles or pipes similar such poles or pipes, with the subject device comprising a long accordingly extending device of generally cylindrically configuration, with one end thereof having a shape in the form of a truncated conical member, while the other end has a cylindrically shaped opening which extends inside the member and wherein the longitudinally central axis of such opening is generally concentric with the longitudinally central axis of the adapter.

2 Claims, 1 Drawing Sheet

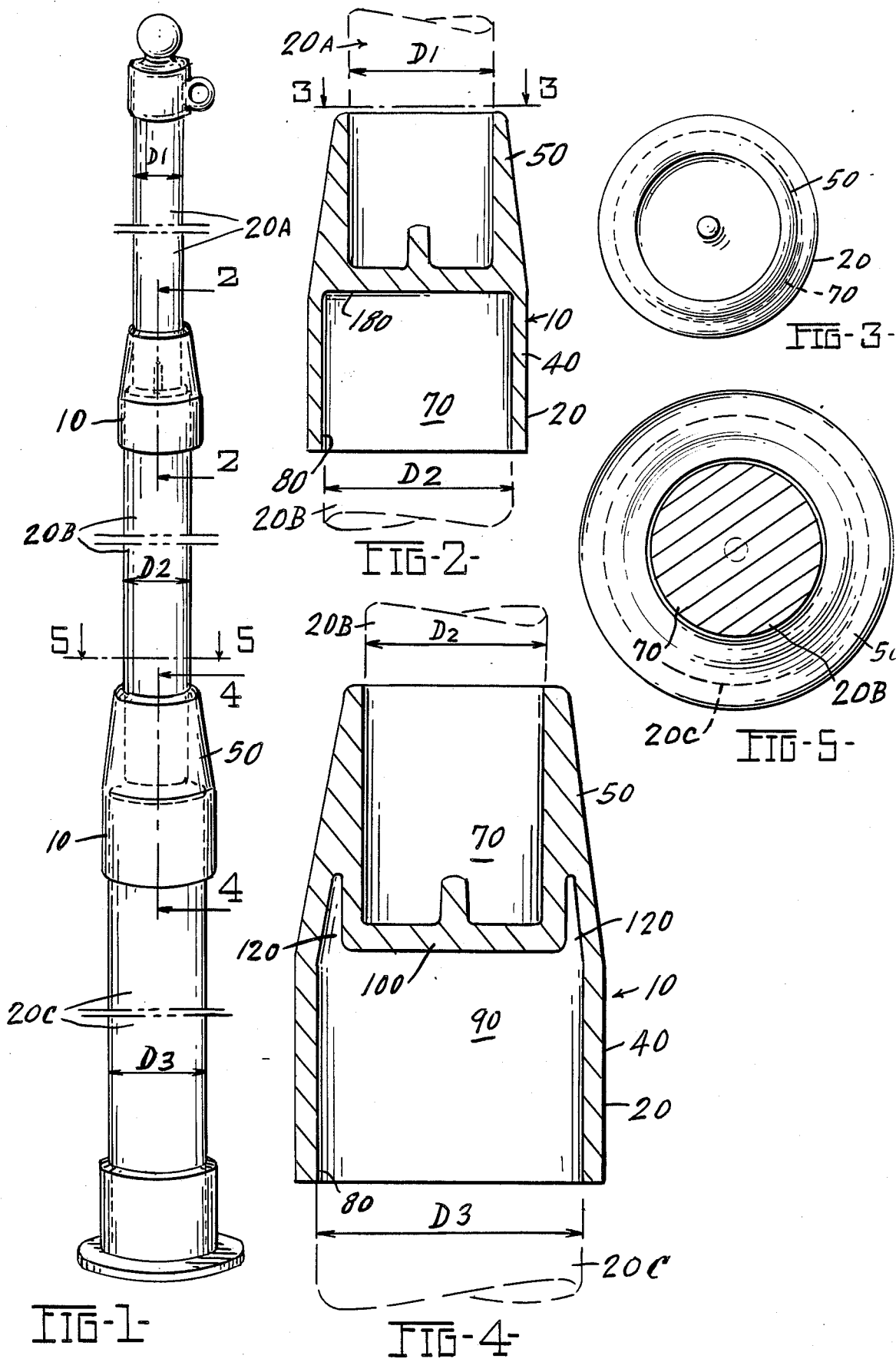

POLE EXTENDING ADAPTER

DISCUSSION OF PRIOR ART AND BACKGROUND OF INVENTION

The subject invention pertains to adapters and similar fittings that are structured to help extend the length of a pole or pipe to increase the length and height of such pole or pipe.

In this respect, there are devices existing in the art which are constructed to interconnect various lengths of pole or pipe so as to yield a unitary pole or pipe of extended length. Such known adapters are cumbersome to use and are generally only marginally effective in maintaining unitary pole or pipe length and therefore have not been effective to such end.

The subject invention is adapted as an adapter to interconnect undivided pole or pipe lengths to overcome the existing shortcomings in the prior art and the following objects of the subject invention are directed accordingly.

OBJECTS

It is an object of the subject invention to provide an improved device for interconnecting pole or pipe members;

It is an object of the subject invention to provide an improved device for helping to interconnect various lengths of pole or pipe;

Another object of the subject invention is to provide a device for extending the length of a pole or pipe;

Yet another object of the subject invention is to provide a device for interconnecting individual pole or pipe lengths;

Other and further objects of the subject invention will become apparent from a reading of the following description taken in conjunction with the drawings.

DESCRIPTION OF GENERAL EMBODIMENT

The subject invention is an adapter aiding in the extension of long, traditionally extending pole or pipe members, such as flag poles or similar such pipes, with the subject device comprising a long accordingly extending device of generally cylindrically configuration, with one end thereof having a shape in the form of a truncated conical member, while the other end has a cylindrically shaped opening which extends inside the member and wherein the longitudinally central axis of such opening is generally concentric with the longitudinally central axis of the adapter.

BRIEF DESCRIPTION OF THE DRAWINGS

FIG. 1 illustrates the pipe extending adapter supporting pole or pipe members.

FIG. 2 is a cross-sectional view along lines 2—2 of FIG. 1 showing an alternate embodiment of the invention.

FIG. 3 is a view along the lines of 3—3 in FIG. 2.

FIG. 4 is a cross-sectional view along lines 4—4 of FIG. 1 showing an embodiment of the invention.

FIG. 5 is a view along lines 5—5 in FIG. 1.

DESCRIPTION OF PREFERRED EMBODIMENT

Referring now to the drawings in which a preferred embodiment is shown, a pole or pipe adapting device 10 is shown. The pole or pipe adapting device is a coupling device, of a linear nature, adapted to join in a linear relationship two separate longitudinally extending pole or pipe members 20A and 20B so that the individual poles or pipes 20A and 20B are aligned along a common longitudinally extending central axis to form essentially one extended pole or pipe.

As can be seen from a view of FIG. 1, the pole or pipe adapter 10 is basically comprised of a longitudinally extending cylindrical member 30. More specifically, the pole or pipe adapter is a longitudinally extending member, one portion of which is fully cylindrical, with such portion thusly being referred to as the cylindrical portion 40. The other portion of the pole or pipe adapter is a truncated conical member 50 and joints the cylindrical portion 40 is a longitudinal fashion with the two portions having a common longitudinal central axis A—A, as seen in FIG. 1.

As can be seen from the drawings, the cylindrical portion of the adapter 10 has a hollow cylindrical chamber 70 inside, as shown, with the lower part of the chamber being open to the outside, as shown. The the opening 80 which communicates between the chamber 70 and the outside is circular such that the circular rim of such opening 80 is the same diameter as the cylindrical chamber 70, which has constant diameter.

The upper part 90 of the chamber is formed by a flat upper surface 100. Alternately stated, that end surface 100 which is opposite to opening 80 is preferably flat, however, as can be seen from the cross-sectional view of the particular embodiment shown in FIG. 4, the upper portion 100 of the cylindrical chamber 70 has a circular recession 120 around the upper radially outer circumferential portion of the cylindrical chamber 70. This circumferentially extending recession 120 extends upwardly into the upper truncated portion 50 of adapter 10, as shown, and in the embodiment shown in the drawings such recession 120 becomes more narrow as it extends upwardly into truncated section and when viewed in the cross-sectional configuration of FIG. 4, the recession 120 appears triangular in configuration in such cross-sectional view. The purpose of this recession 120 is to receive in a somewhat secure manner the end circumferential edge of a hollow pole or pipe or similar hollow elongated member such as tubular pole member 20B and the one end 150 which is inserted into said hollow cylindrical chamber 70 as shown in FIG. 1. This helps to secure the end of the pipe 20B into the mating female cylindrical chamber 70, as shown.

In an alternate embodiment of the subject invention, as shown in FIG. 2, the cylindrical chamber does not have an upper circumferential recession, as shown in FIG. 2, with the upper surface 180 of said chamber 70 in said adapter member 10 being completely fast as shown in the drawings.

As seen in FIGS. 2 and 4 the upper truncated conical section has a cylindrical chamber 200 extending downwardly into the truncated section 50, as shown in such FIG. 2. This cylindrical chamber 200 opens at the top of adapter 10 and thus extends into the adapter from the opposite direction as chamber 70, as can be seen in the drawings.

Preferably the lower part of the chamber 200 is flat and has no depression on the circumferential edge as in the circumstance of the chamber 70, however such a depression can be provided in chamber 200. Additionally, the diameter of chamber 200 is constant as in the case of chamber 70, so that the end of a pole or pipe, such as pole 20A can be inserted in such chamber in snug and conforming manner as shown in FIG. 1. In similar fashion, pole end 20B is inserted in chamber 70 and by the process poles 20A and 20B are longitudinally joined as shown.

In the embodiment shown in the drawings a vertical stud 600 is integrally appended to the bottom surface of chamber 200 to strengthen such chamber. Other variations from the preferred embodiment may be effected.

In summary, the subject invention is a pipe extending adapter for interconnecting two separate pipes juxtaposed relative to one another along a common longitudinally extending central axis, with such adapter comprising a longitudinally extending member of generally cylindrical configuration, such longitudinally extending member having a cylindrical depression on the one end and a second cylindrical depression on the opposite end, and wherein such second cylindrical depression is larger in diameter than the first cylindrical depression.

While a preferred embodiment has been shown, it shall not be considered as limiting the scope of the subject invention.

I claim:

1. A pipe extending adapter for interconnecting two separate pipes juxtaposed relative to one another along a common longitudinally extending central axis, with said adapter comprising a longitudinally extending member of generally cylindrical configuration, having one end and an opposite end, said longitudinally extending member having a first cylindrical chamber open on the one end and a second cylindrical chamber open on the opposite end, and wherein said second cylindrical chamber is larger in diameter than the first cylindrical chamber, and further wherein said second cylindrical chamber and said first cylindrical chamber are coaxially aligned with one another, with a solid wall extending across said central axis separating said first and second chambers, said solid wall having a flat inner well surface facing said first chamber, and wherein said second chamber has a circumferentially extending recess extending around the radially outer extremity portion of the second cylindrical chamber, which is nearest to the solid wall separating the first and second cylindrical chambers, and which cylindrical depression extends into the solid wall separating said first and second cylindrical chambers and which depression has a greater width at its initial opening than that part of such depression that is most distal from its intial opening, and further wherein said first cylindrical chamber has a longitudinally extending stud projecting from a portion of the flat inner wall surface into the area of said first chamber.

2. An extending and joining adapter for joining together two separate extending members in a longitudinally extending joined manner along a common longitudinally extending central axis, said adapter comprising:

(a) a longitudinally extending member having a longitudinally extending central axis, said longitudinally extending member having a first end and a second end and a solid middle portion extending across said central axis and said longitudinally extending member having formed therein two cylindrical chambers, a first chamber of cylindrical shape and a second chamber of cylindrical shape which first chamber and second chamber are separated from one another by said solid middle portion and which first chamber is open at the first end of said longitudinally extending member and extends towards the solid middle portion of said longitudinally extending member, and which second chamber is open at the second end and extends towards the solid middle portion of said longitudinally extending member, and wherein said second chamber is larger in circumferential diameter than said first chamber, and wherein that portion of said second chamber that abuts against said solid middle portion of said longitudinally extending member has a circumferentially extending recess that extends into said solid middle portion and wherein the width of said recess decreases as it extends into said solid middle portion of said longitudinally extending member, and wherein said solid middle portion has a longitudinal stud thereon extending into said first chamber.

* * * * *